United States Patent [19]

Keogh

[11] 4,328,323

[45] May 4, 1982

[54] PRODUCTION OF SILANE MODIFIED COPOLYMERS OF ALKYLENE-ALKYL ACRYLATES

[75] Inventor: Michael J. Keogh, Bridgewater, N.J.

[73] Assignee: Union Carbide Corporation, New York, N.Y.

[21] Appl. No.: 192,319

[22] Filed: Sep. 30, 1980

Related U.S. Application Data

[63] Continuation-in-part of Ser. No. 70,785, Aug. 29, 1979, which is a continuation-in-part of Ser. No. 892,153, Mar. 31, 1978, abandoned.

[51] Int. Cl.$^3$ .......................... C08G 81/02; C08F 8/00
[52] U.S. Cl. .................................... 525/106; 525/288; 525/102
[58] Field of Search ..................... 525/106, 102, 288

[56] References Cited

U.S. PATENT DOCUMENTS

| | | | |
|---|---|---|---|
| 3,193,567 | 7/1965 | Rossmy | 528/10 |
| 3,408,420 | 10/1968 | Wiggill | 525/102 |
| 3,644,566 | 2/1972 | Kincheloe et al. | 525/106 |
| 3,776,977 | 12/1973 | Chadha | 525/100 |

*Primary Examiner*—Wilbert J. Briggs, Sr.
*Attorney, Agent, or Firm*—James C. Arvantes

[57] ABSTRACT

The disclosure of this application is directed to the production of silane modified copolymers of alkylene-alkyl acrylates by reacting a mixture containing a polysiloxane, particularly an organo titanate containing polysiloxane and a copolymer of alkylene-alkyl acrylate to produce a water curable, silane modified copolymer. The silane modified copolymers can be extruded about electrical conductors to provide insulation thereon characterized by improved surface characteristics.

30 Claims, No Drawings

PRODUCTION OF SILANE MODIFIED COPOLYMERS OF ALKYLENE-ALKYL ACRYLATES

This application is a continuation-in-part of copending application Ser. No. 70,785 filed Aug. 29, 1979 which in turn is a continuation-in-part of application Ser. No. 892,153 filed Mar. 31, 1978, now abandoned.

SUMMARY OF THE INVENTION

This application relates to the production of silane modified copolymers of alkylene-alkyl acrylates, by the reaction of a polysiloxane and an alkylene-alkyl acrylate copolymer, which can be extruded about electrical conductors and water-cured, if so desired, to crosslinked products, providing insulation about electrical conductors which is characterized by improved surface characteristics. More particularly, this invention relates to polysiloxanes having combined therein an organo titanate and the use thereof in the production of silane modified copolymers of alkylene-alkyl acrylates.

BACKGROUND OF THE INVENTION

Water-curable, silane modified copolymers of alkylene-alkyl acrylates and a process for the preparation thereof by reacting a mixture containing a silane and an alkylene-alkyl acrylate copolymer are described in detail by my copending application Ser. No. 70,785 filed Aug. 29, 1979, the disclosure of which is incorporated herein by reference. The silane modified copolymers, as described in my copending application, can be extruded about electrical conductors such as wire and cable and water-cured to crosslinked products to provide insulation thereon of excellent quality.

It is customary, prior to extruding silane modified alkylene-alkyl acrylate copolymers about wire and cable, to insure removal therefrom of undesirable volatiles. The presence of undesirable volatiles could lead to the formation of voids in the extruded insulation, marring the appearance of the final insulated product and, in some instances, shortening its working life. In addition, removal of undesirable volatiles from the silane modified copolymers reduces odor problems at the extruder and in the insulated wire or cable. Obviously, removal of volatiles from the silane modified copolymers, by a subsequent devolatilization step after the preparation of the copolymers, increases the time required to produce an insulated product and, also, increases the overall cost thereof.

DESCRIPTION OF THE INVENTION

The present invention provides for the production of silane modified copolymers of alkylene-alkyl acrylates which are free of undesirable volatiles and consequently need not be subjected to a subsequent devolatilization step. The silane modified copolymers, prepared in accordance with the present invention, can be directly extruded about wires and cables and water-cured to crosslinked products to provide insulation thereon, free of undesirable voids and odors.

In one aspect of the present invention a silane modified copolymer is produced by reacting a mixture containing an alkylene-alkyl acrylate copolymer and a polysiloxane containing repeating units of the formula:

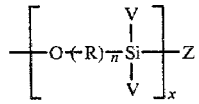

Formula I wherein R is a hydrocarbon or oxy substituted hydrocarbon radical; each V, which can be the same or different, is hydrogen, a hydrocarbon radical or a hydrolyzable group; Z is a hydrolyzable group; n is an integer having a value of one to 18 inclusive and x is an integer having a value of at least 2, generally 2 to 1000 inclusive, preferably 5 to 25 inclusive.

Illustrative of suitable hydrocarbon radicals for R are alkylene radicals having one to 18 carbon atoms inclusive, preferably one to 6 carbon atoms inclusive, such as methylene, ethylene, propylene, butylene, hexylene and the like; alkoxy radicals having one to 18 carbon atoms inclusive, preferably one to 6 carbon atoms inclusive such as methyloxymethyl, methyloxypropyl, ethyloxyethyl, ethyloxylpropyl, propyloxypropyl, propyloxybutyl, propyloxyhexyl and the like.

As stated, each V can be hydrogen, a hydrocarbon radical or a hydrolyzable group. Illustrative of suitable hydrocarbon radicals are alkyl radicals having one to 18 carbon atoms, preferably one to 6 carbon atoms inclusive such as methyl, ethyl, n-propyl, isopropyl, n-butyl, n-hexyl and the like; alkoxy radicals having one to 18 carbon atoms inclusive, preferably one to 6 carbon atoms inclusive, such as methoxy, ethoxy, propoxy, hexoxy, dodecyloxy, methoxyethoxy and the like; aryl radicals having 6 to 8 carbon atoms inclusive such as phenyl, methyl phenyl, ethyl phenyl and the like; cycloaliphatic radicals having 5 to 8 carbon atoms inclusive such as cyclopentyl, cyclohexyl, cyclohexyloxy and the like.

Z, as previously stated, is a hydrolyzable group among which can be noted alkoxy radicals as previously described for R; oxy aryl radicals such as oxyphenyl and the like; oxyaliphatic radicals such as oxyhexyl and the like; halogens such as chlorine and the like and other hydrolyzable groups as further described in U.S. Pat. No. 3,408,420 to John B. Wiggill patented Oct. 29, 1968.

Polysiloxanes having repeating units falling within the scope of Formula I can be prepared as described in U.S. Pat. No. 3,193,567 to Gerd Rossmy patented July 6, 1965 or by condensing and polymerizing a silane falling within the scope of Formula II in the presence of a metal carboxylate. Among suitable metal carboxylates can be noted dibutyltin dilaurate, stannous acetate, stannous octoate, lead naphthenate, zinc octoate, iron 2-ethyl hexoate and the like. Conditions employed for the production of polysiloxanes, reaction temperatures, amount of materials and the like, using metal carboxylates as catalysts are the same as subsequently described with respect to the use of organo titanates.

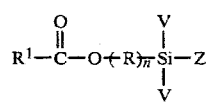

Formula II wherein $R^1$ is a hydrocarbon radical, as for example an alkyl radical having one to 18 carbon atoms inclusive, preferably one to four carbon atoms inclusive such as methyl, ethyl, n-propyl, isopropyl, n-butyl and the like;

alkylene radicals having two to 18 carbon atoms inclusive, preferably two to 4 carbon atoms inclusive such as ethylene, propylene and the like; aryl radicals having six to ten carbon atoms inclusive such as phenyl, benzyl and the like. Other variables are as previously defined.

Exemplary of suitable silanes falling within the scope of Formula II are the following:

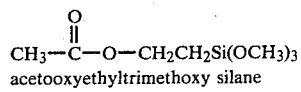
acetooxyethyltrimethoxy silane

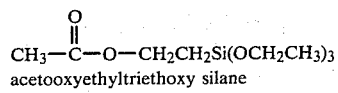
acetooxyethyltriethoxy silane

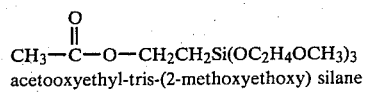
acetooxyethyl-tris-(2-methoxyethoxy) silane

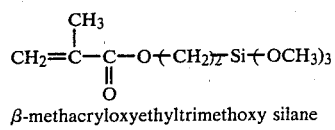
β-methacryloxyethyltrimethoxy silane

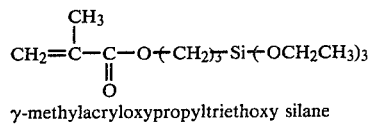
γ-methylacryloxypropyltriethoxy silane

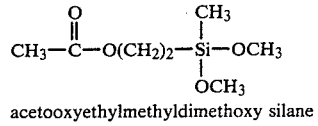
acetooxyethylmethyldimethoxy silane

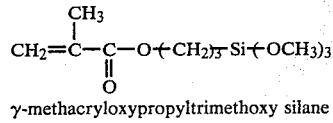
γ-methacryloxypropyltrimethoxy silane

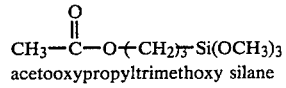
acetooxypropyltrimethoxy silane

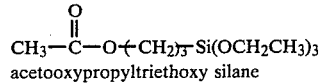
acetooxypropyltriethoxy silane

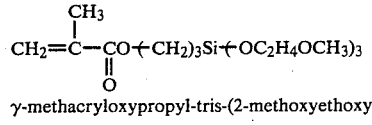
γ-methacryloxypropyl-tris-(2-methoxyethoxy) silane

Preferred polysiloxanes, for purposes of this invention, contain repeating units falling within the scope of Formula I and have combined therein an organo titanate. The organo titanate modified polysiloxanes can be used as such, without the use of additional organo titanate catalyst, to react with the copolymers of alkylene-alkyl acrylate.

The preferred polysiloxanes have a viscosity of about 0.5 poise to about 150 poise, preferably about one to about 20 poise as determined by a Gardner-Holt bubble viscometer at a temperature of 25° C.

Organo titanate modified polysiloxanes can be prepared by reacting a mixture containing a silane falling within the scope of Formula II with an organo titanate falling within the scope of Formula III.

$$Ti(OR^2)_4 \quad \text{Formula III}$$

wherein each $R^2$, which can be the same or different, is hydrogen or a hydrocarbon radical having one to 18 carbon atoms inclusive, preferably one to 14 carbon atoms inclusive.

Exemplary of suitable hydrocarbon radicals are alkyl radicals such as methyl, ethyl, n-propyl, isopropyl, butyl, octyl, lauryl, myristyl, stearyl and the like, cycloaliphatic radicals such as cyclopentyl, cyclohexyl and the like, aryl radicals such as phenyl, methylphenyl, chlorophenyl and the like; alkaryl radicals such as benzyl and the like.

Particularly desirable titanates falling within the scope of Formula III are those wherein each $R^2$ is alkyl having one to 18 carbon atoms inclusive, preferably one to 14 carbon atoms inclusive, exemplified by tetrabutyl titanate, tetraisopropyl titanate and the like.

Organo titanates falling within the scope of Formula III are known compounds and can be conveniently prepared as described in U.S. Pat. No. 2,984,641 to Leon E. Wolinski patented May 16, 1961.

Other suitable organo titanates are the organo titanium chelates such as tetraoctylene glycol titanium, triethanol amine titanate, titanium acetyl acetonate, titanium lactate and the like.

At least a catalytic amount of organo titanate is used to produce the organo titanate modified polysiloxanes, that is an amount sufficient to catalyze the condensation and polymerization reaction to produce a polysiloxane. As a rule, the amount of organo titanate used is on the order of about 0.001 to about 25 percent by weight based on the weight of the monomeric silane. It is preferred to use about 0.5 to about 5 percent by weight of organo titanate based on the weight of the monomeric silane.

The temperature at which the reaction is conducted can be varied over a wide range, for example from about 0° C. to about 250° C. A temperature in the range of about 70° C. to about 130° C. is preferred. Also the reaction can be conducted using a suitable solvent, illustrated by hydrocarbon solvents such as toluene, xylene, cumene, decaline, dodecane, chlorobenzene and the like.

The reaction between the organo titanate and the monomeric silane can be conducted under atmospheric, subatmospheric or superatmospheric pressure. It is preferred to conduct the later stages of the reaction under subatmospheric pressure to allow for more facile removal of volatile by-products. Also, the reaction is preferably conducted under the atmosphere of an inert gas such as nitrogen or argon to avoid formation of a gel due to the water sensitivity of the product.

Control of the repeating unit, Formula I, of the polysiloxane can be effected by introducing an end blocker, as for example, a high boiling ester into the reaction mixture, at the beginning of the reaction or at any convenient point in the reaction process.

The number of repeating units of the polysiloxane is equal to the mole ratio of the monomeric silane to the end blocker as exemplified by the following simplified reaction scheme wherein the silane is shown to be acetooxyethyltrimethoxy silane and the high boiling ester is shown to be methyl benzoate.

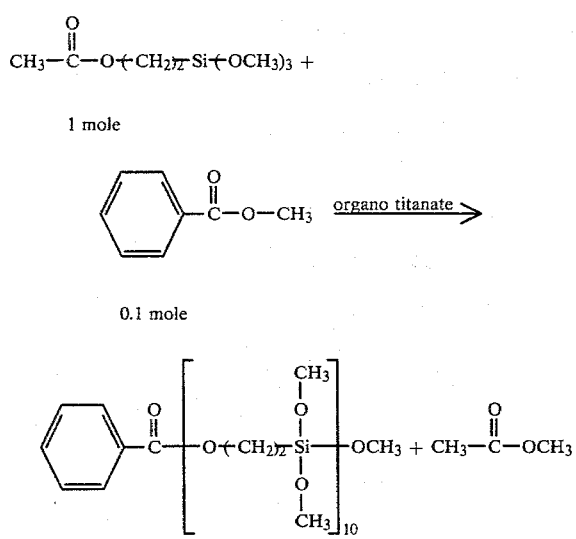

Suitable end blockers have the general formula

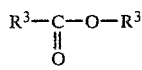

wherein each $R^3$, which can be the same or different, is a hydrocarbon radical as defined for $R^2$.

Completion of the reaction is evidenced by cessation of the evolution of volatiles and the weight/volume of volatiles collected as compared to the theoretical weight/volume. Alternatively, the reaction can be run to a desired viscosity level and the reactants cooled to stop the reaction.

The alkylene-alkyl acrylate copolymers with which the polysiloxanes are reacted to form the silane modified copolymers are known copolymers produced by reacting an alkene with an alkyl acrylate.

Suitable alkenes are ethylene, propylene, butene-1, isobutylene, pentene-1, 2-methylbutene-1, 3-methylbutene-1 hexene, heptene-1, octene-1, and the like.

The alkylene moiety of the alkylene-alkyl acrylate copolymer generally contains from 2 to 18 carbon atoms inclusive, preferably 2 to 3 carbon atoms inclusive.

Suitable alkyl acrylate monomers which are copolymerized with the alkenes fall within the scope of the following formula:

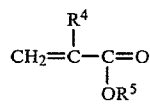

Formula IV wherein $R^4$ is hydrogen or methyl and $R^5$ is alkyl having one to 8 carbon atoms inclusive. Illustrative compounds encompassed by this formula are: methyl acrylate, ethyl acrylate, t-butyl acrylate, methyl methacrylate, n-butyl acrylate, n-butylmethacrylate, 2-ethylhexyl acrylate and the like.

Alkylene-alkyl acrylate copolymers generally have a density (ASTM D 1505) with conditioning as in ASTM D 147-72) of about 0.92 to about 0.94 and a melt index (ASTM-1238 of 44 psi tested pressure) of about 0.5 to about 500 decigrams per minute.

For purposes of the present invention, the preferred copolymer is a copolymer of ethylene-ethyl acrylate, generally having about one to about 50 percent by weight combined ethyl acrylate, preferably having about 2 to about 20 percent by weight combined ethyl acrylate.

The production of a silane modified copolymer of an alkylene-alkyl acrylate is carried out by reacting a polysiloxane, as described, with a copolymer of an alkylene-alkyl acrylate in the presence of an organo titanate catalyst.

In those instances wherein the polysiloxane contains combined organo titanate, additional organo titanate catalyst may not be necessary, especially when at least about 0.5 percent by weight organo titanate, based on the weight of the monomeric silane, was used in the preparation of the polysiloxane.

The amount of organo titanate catalyst added to the reaction mixture is a catalytic amount, sufficient to catalyze the reaction between the polysiloxane and the copolymer. A preferred amount is from about 0.001 to about 50 percent by weight, most preferably about 0.1 to about 25 percent by weight based on the weight of the polysiloxane.

The amount of polysiloxane used can vary from about 0.05 to about 10 and preferably about 0.3 to about 5 percent by weight based on the weight of the copolymer.

The temperature at which this reaction is carried out is not critical and can vary, conveniently, from about 80° C. to about 300° C. and preferably from about 150° C. to about 230° C.

The reaction can be carried out at atmospheric, subatmospheric or superatmospheric pressure, although atmospheric pressure is preferred and in the presence of solvents as previously described.

Completion of the reaction is evidenced by measurement of no further viscosity change.

Recovery of the silane modified copolymer is effected by allowing the contents of the reaction flask to cool and discharging to a suitable receiver for storage preferably under an inert gas blanket.

The reaction can be carried out in any suitable apparatus, preferably an apparatus in which the copolymer is subjected to mechanical working such as a Brabender mixer, a Banbury mixer or an extruder. The polysiloxane can be added to the fluxed copolymer and the organo titanate, if needed, then added. Alternatively, the organo titanate, if needed, can be added to the copolymer prior to the addition of the polysiloxane. Also, organo titanate and polysiloxane can be premixed and added to the fluxed polymer.

The reaction between the alkylene-alkyl acrylate copolymer and the polysiloxane may be depicted by the following equation:

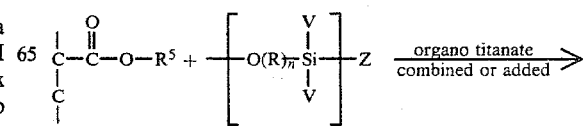

segment of alkylene-
alkyl acrylate copolymer
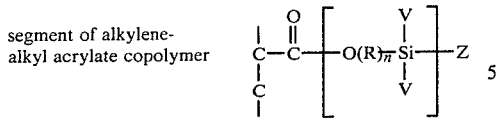

wherein the variables are as previously defined and the silicon containing unit is present in an amount of at least about 0.05 percent by weight, generally about 0.1 to about 10 percent by weight and preferably about 0.3 to about 5 percent by weight based on the total weight of the modified copolymer.

The curing or crosslinking of the silane modified alkylene-alkyl acrylate copolymer is effected by exposing the copolymer to moisture. The moisture present in the atmosphere is usually sufficient to permit curing to occur over a period of 48 hours.

The rate of curing, in a matter of 30 minutes, can be accelerated by exposure to an artifically humidifed atmosphere or immersion in water, and heating to elevated temperatures or by exposure to steam.

Generally, curing is effected at temperatures on the order of about 23° C. to about 100° C., preferably about 70° C. to about 100° C.

Additionally, the crosslinking may be carried out in the presence of a silanol condensation catalyst. A unique feature of this invention is that the crosslinking reaction can be carried out at significant rates in the absence of added silanol condensation catalyst. The organo titanate catalyst or catalyst residues present in the production of the silane modified copolymers also catalyze the crosslinking reaction.

Alternatively, a wide variety of materials which function as silanol condensation catalysts and which are known in the art can be employed in the crosslinking process. Such materials include metal carboxylates previously described; organic bases such as ethylamine, hexylamine dibutylamine and piperidine and the like and acids such as mineral acids and fatty acids and the like.

To the silane modified copolymers of this invention may be added various additives, in amounts well known in the art, such as fillers among which can be mentioned carbon black, clay, talc, (magnesium silicate), calcium carbonate, silica, aluminum hydroxide and the like.

The silane modified copolymers can be rendered flame retardant by the addition thereto of halogen containing flame retardants such as decabromodiphenyl oxide, chlorinated polyethylene, polyvinyl chloride and halogenated paraffin waxes, alone, or in admixture with organic or inorganic antimony compounds such as antimony oxide and/or alkaline earth metal oxides, carbonates, hydroxides and sulfates. Among such alkaline earth metal compounds can be noted calcium oxide, calcium carbonate, calcium hydroxide, calcium sulfate, magnesium oxide, magnesium carbonate, magnesium hydroxide and magnesium sulfate.

It is to be noted that the disclosure of all patents noted are incorporated herein by reference.

The following examples further illustrate the present invention and are not intended to limit the scope thereof.

EXAMPLE 1

A. Preparation of Polysiloxane

The reaction scheme for the preparation of the polysiloxane can be depicted as follows wherein the silane monomer was acetooxyethyltrimethoxy silane:

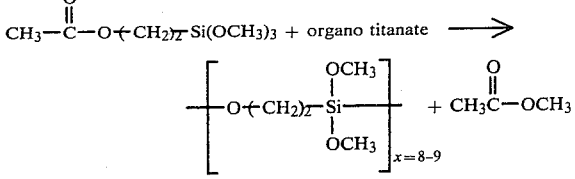

One hundred and four grams (0.5 mole) of acetooxyethyltrimethoxy silane were placed in a 250 ml. three-necked, round bottom flask and heated to a temperature of 75° C. under a nitrogen gas atmosphere. When the contents of the flask reached a temperature of 75° C., 1.191 grams of tetraisopropyl titanate were added thereto using a syringe. The reaction mixture was heated for three hours at a temperature of 95° C.–110° C. Volatiles evolved during the reaction and were condensed in a dry ice trap. At the end of the three hour period, the contents of the flask were cooled to room temperature, about 23° C., the residue removed from the flask, weighed and stored under argon.

| YIELD | ACTUAL | THEORETICAL | PERCENT OF THEORETICAL |
|---|---|---|---|
| Volatiles | 32.9 grams | 37 grams | 87 |
| Polysiloxane Product | 69.0 grams | 71.8 grams | 96 |

Viscosity of Polysiloxane Product - 3.4 poise

INFRARED ANALYSIS

Volatiles; strong absorption at 1685 reciprocal centimeters which is consistent with strong adsorption at 1690 reciprocal centimeters for a known sample of methyl acetate.

Polysiloxane Product; strong absorption at 1080 reciprocal centimeters which is consistent with Si—O—CH$_3$ group; weak absorption at 1692 reciprocal centimeters which is consistent with signficant reduction of carbonyl groups.

Value of n as 8–9 is consistent with viscosity of product and amount of volatiles recovered.

B. Preparation of Silane Modified Copolymer of Ethylene-Ethyl Acrylate

To a 300 cc Brabender mixer heated to a temperature of 160° C. and maintained under a blanket of argon gas, there was added 244 grams of a copolymer of ethylene-ethyl acrylate, having a melt index of 1.2 and containing 16 percent by weight combined ethyl acrylate and 1.26 grams of 1,2-dihydro-2,3,4-trimethyl quinoline, an antioxidant. This mixture was fluxed and mixed rapidly for 2 minutes. To the fluxed mixture, there was added, by means of a syringe, 5.80 grams of a mixture of the polysiloxane of (a) and dibutyltin dilaurate. The 5.80 gram mixture contained 97 percent by weight polysiloxane and 3 percent by weight dibutyltin dilaurate. After homogeneity was reached in the Brabender, as indicated by a constant torque measurement, 1.26 grams of tetraisopropyl titanate were added to the contents of the Brabender. The contents of the Brabender were then maintained at a temperature of 160°–170° C. for a period of 30 minutes resulting in a reaction whereby the silane reacted with the ethylene-ethyl acrylate copolymer as evidenced by an increase in torque. Volatiles which evolved during the reaction were condensed in a dry ice trap which was connected to the Brabender. At the end of the 30 minute period, the contents of the Brabender were discharged into a polyethylene bag under an atmosphere of argon.

The volatiles which were collected weighed 0.03 grams.

EXAMPLE 2

This example was conducted in the same manner as Example 1 with the exception that no additional tetraisopropyl titanate was used. The reactants and amounts thereof were as follows:

| Ethylene-ethyl acrylate copolymer (same as used in Example 1) | 246 grams |
|---|---|
| 1,2-dihydro-2,3,4-trimethyl quinoline | 1.26 grams |
| Polysiloxane (prepared as described in Example 1A) | 5.80 grams |

The volatiles which were collected weighed 0.03 grams.

CONTROL

To a 300 cc Brabender mixed heated to a temperature of 160° C. and maintained under a blanket of argon gas, there was added 241 grams of a copolymer of ethylene-ethyl acrylate having a melt index of 1.2 and containing 16 percent by weight combined ethyl acrylate and 1.26 grams of 1,2-dihydro-2,3,4-trimethyl quinoline. This mixture was fluxed and mixed rapidly for 2 minutes. To the fluxed mixture, there was added, by means of a syringe, 8.84 grams of a mixture of acetooxyethyltrimethoxy silane

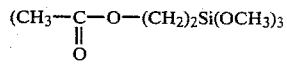

and dibutyltin dilaurate. The 8.84 gram mixture contained 97 percent by weight acetooxyethyltrimethoxy silane and 3 percent by weight dibutyltin dilaurate. After homogeniety was reached in the Brabender, as indicated by a constant torque measurement, 1.26 grams of tetraisopropyl titanate were added to the contents of the Brabender. The contents of the Brabender were then maintained at a temperature of 160°-170° C. for a period of thirty minutes resulting in a reaction whereby the silane reacted with the ethylene-ethyl acrylate copolymer. Volatiles which evolved during the reaction were condensed in a dry ice trap which was connected to the Brabender. At the end of the thirty minute period, the contents of the Brabender were discharged into the polyethylene bag under an atmosphere of argon.

The volatiles which were collected weighed 3.01 grams.

20 gram samples of silane modified copolymers of Example 1, Example 2 and Control 1 were pressed into plaques of the following dimensions: 3 inches × 3 inches × 0.075 inch in a five minute cycle at a temperature of 110° C.–115° C. under a pressure of 5000 psig.

The plaques were cured by being suspended in water, which was at a temperature of 90° C., for three hours. After the three hour water-cure, the plaques were removed from the water, wiped dry and placed in a vacuum oven, which was at a temperature of 50° C., for one hour in order to insure removal of residual water.

The plaques were then measured for degree of crosslinking, according to the Monsanto Rheometer test. This test procedure is described, more fully, in U.S. Pat. No. 4,018,852 to Donald L. Schober, granted Apr. 19, 1977. FIG. 1 of the drawing of this patent shows the typical Rheometer curve. The level of vulcanization or crosslinking is designated as H and is measured in terms of inch-pounds of torque on the Rheometer test equipment.

Results with respect to the plaques tested are as follows:

|  | Average of (2) Plaques Tested |
|---|---|
| Plaques of Example 1 | 53 inch-pounds |
| Plaques of Example 2 | 53 inch-pounds |
| Plaques of Control 1 | 53 inch-pounds |

Results show that a copolymer reacted with a polysiloxane has the same degree of crosslinking, with evolution of signficantly less volatiles, than a copolymer reacted with a monomeric silane.

EXAMPLE 3

This example illustrates the preparation of a polysiloxane using an end blocker.

A three liter flask was charged with 2140 grams (10.29 moles) of acetooxyethyltrimethoxy silane, 154 grams (1.03 moles) of ethyl benzoate and the contents of the flask brought to a temperature of 85° C. To this mixture, there was then added 21 grams of tetraisopropyl titanate. The solution, kept under an argon gas atmosphere, was stirred while being heated for 5¾ hours at a temperature of 94° C.–125° C. During this period of time, 752 grams of volatiles were collected in an acetone dry ice trap. This was 98.8 percent of the theoretical amount of methyl acetate based on 100 percent conversion. The polysiloxane product recovered weighed 1543 grams, 99.3 percent of the theoretical yield. Viscosity of the product was 1.4 poise. The equation for the preparation is as follows:

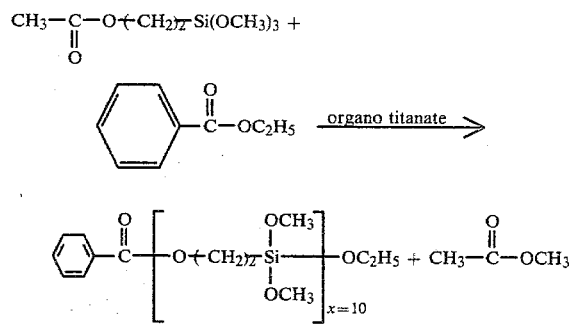

EXAMPLE 4

Example 3 was repeated using the same reactants, same molar amounts and same reaction conditions with the exception that acetooxyethylmethyldimethoxy silane was used as the monomeric silane. Viscosity of the product was 1.4 poise.

The silane modified copolymers of alkylene-alkyl acrylates, although described primarily for use as insulation, can also be used as jacketing about industrial cables, telephone wires and cables.

What is claimed is:

1. Process of producing a water-curable, silane modified alkylene-alkyl acrylate copolymer which comprises reacting a mixture containing an alkylene-alkyl acrylate copolymer, a polysiloxane having the repeating unit:

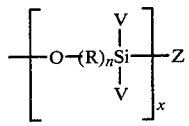

wherein R is a hydrocarbon radical, or oxy substituted hydrocarbon radical each V is hydrogen, a hydrocarbon radical or a hydrolyzable group and Z is a hydrolyzable group, n is an integer having a value of 1 to 18 inclusive, x is an integer having a value of at least 2 and an organic titanate.

2. Process as defined in claim 1 conducted at a temperature of about 80° C. to about 300° C.

3. Process as defined in claim 1 conducted at a temperature of about 150° C. to about 230° C.

4. Process as defined in claim 1 wherein the organo titanate has the formula:

wherein each $R^2$ is hydrogen or a hydrocarbon radical.

5. Process as defined in claim 4 wherein each $R^2$ is an alkyl radical having 1 to 18 carbon atoms inclusive.

6. Process as defined in claim 1 wherein the said copolymer is a copolymer of ethylene-ethyl acrylate.

7. Process as defined in claim 1 wherein R is the repeating unit of the silane is an alkylene radical having 1 to 18 carbon atoms inclusive.

8. Process as defined in claim 1 wherein R in the repeating unit of the silane is $-CH_2-CH_2-$.

9. Process as defined in claim 1 wherein each V in the repeating unit of the silane is methoxy.

10. Process as defined in claim 1 wherein the organo titanate is tetraisopropyl titanate or tetrabutyl titanate.

11. Process as defined in claim 1 wherein the organo titanate is present in an amount of about 0.001 to about 25 percent by weight based on the combined weight of copolymer and polysiloxane.

12. Process as defined in claim 1 wherein the polysiloxane is present in an amount of about 0.5 to about 10 percent by weight based on the weight of the copolymer.

13. Process as defined in claim 1 wherein the polysiloxane contains combined organo titanate.

14. Process as defined in claim 1 wherein the organo titanate is combined with the polysiloxane.

15. Process as defined in claim 1 wherein each V and Z of the polysiloxane are methoxy.

16. Process as defined in claim 1 wherein Z of the polysiloxane is methoxy, one V is methoxy and the second V is methyl.

17. Process as defined in claim 1 wherein the polysiloxane is derived from acetooxyethyltrimethoxy silane.

18. Process as defined in claim 1 wherein the polysiloxane is derived from acetooxyethylmethyldimethoxy silane.

19. Process as defined in claim 1 wherein the said copolymer is a copolymer of ethylene-ethyl acrylate and the polysiloxane is derived from acetooxyethyltrimethoxy silane.

20. Process as defined in claim 1 wherein the said copolymer is a copolymer of ethylene-ethyl acrylate and the polysiloxane is derived from acetooxyethylmethyldimethoxy silane.

21. A water-curable silane modified alkylenealkyl acrylate copolymer produced as defined in claim 1.

22. A water-curable silane modified alkylenealkyl acrylate copolymer produced as defined in claim 6.

23. A water-curable silane modified alkylenealkyl acrylate copolymer produced as defined in claim 14.

24. A water-curable silane modified alkylenealkyl acrylate copolymer produced as defined in claim 19.

25. A water-curable silane modified alkylenealkyl acrylate copolymer produced as defined in claim 20.

26. The cured product of the composition produced as defined in claim 1.

27. An insulated electrical conductor having thereon the cured product defined in claim 26.

28. Process as defined in claim 1 wherein the mixture contains a silanol condensation catalyst.

29. Process as defined in claim 28 wherein the silanol condensation catalyst is dibutyltin dilaurate.

30. A water-curable, silane modified alkylene-alkyl acrylate copolymer produced as defined in claim 28.

* * * * *

UNITED STATES PATENT AND TRADEMARK OFFICE
CERTIFICATE OF CORRECTION

PATENT NO. : 4,328,323
DATED : May 4, 1982
INVENTOR(S) : Michael J. Keogh

It is certified that error appears in the above—identified patent and that said Letters Patent is hereby corrected as shown below:

Column 1, line 30; "by" should read --in--. Column 2, line 8; --radical-- should appear before "or". Column 9, line 40; far left "(" should be deleted; line 57; "the" should read --a--. Column 11, line 2, "0.001" should read -- 0.1 --; lines 3 and 4; "combined weight of copolymer and polysiloxane" should read -- weight of polysiloxane --. Claim 12, line 2; "0.5" should read -- 0.05 --.

Signed and Sealed this

Twelfth Day of October 1982

[SEAL]

Attest:

GERALD J. MOSSINGHOFF

Attesting Officer    Commissioner of Patents and Trademarks